United States Patent Office 2,758,430
Patented Aug. 14, 1956

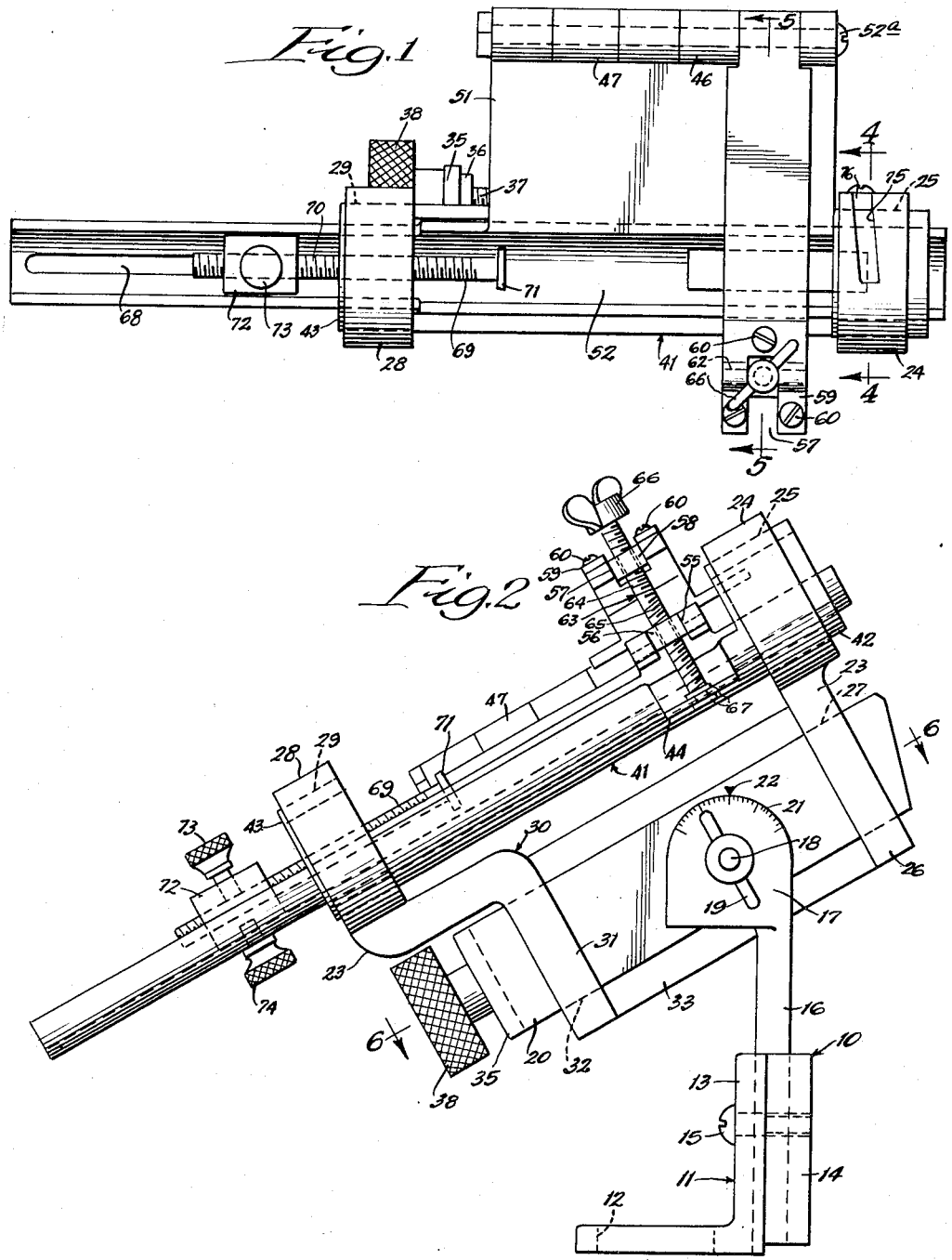

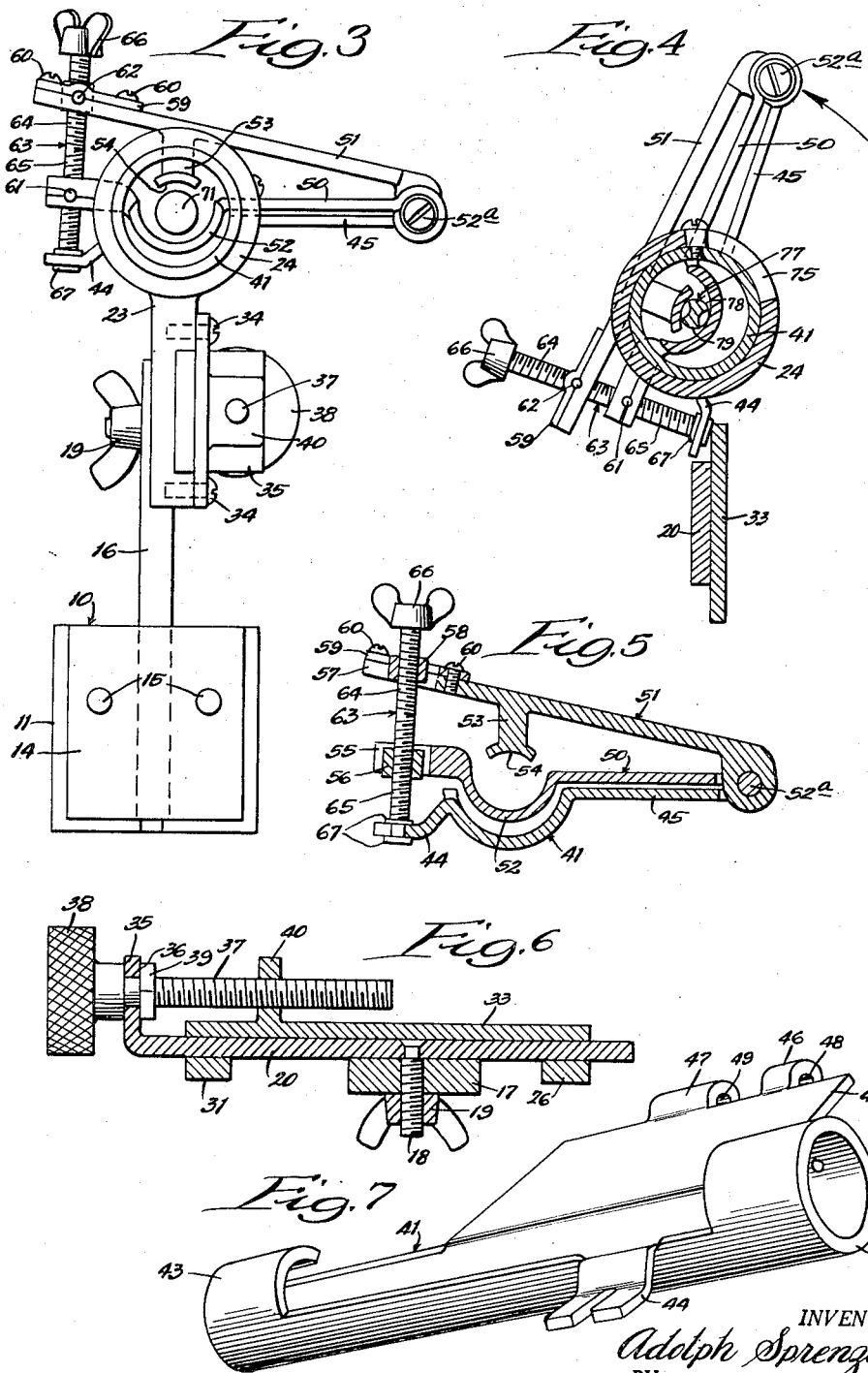

2,758,430
DRILL HOLDER

Adolph Sprenzel, Chicago, Ill.

Application August 26, 1953, Serial No. 376,593

11 Claims. (Cl. 51—219)

This invention relates to a drill holder and, more particularly, to apparatus for holding drills during sharpening thereof while providing limited rotary and axial movement of the drill relative to an abrasive wheel.

The usual drill is equipped circumferentially with spaced spiral flutes or cutting lips. Usually there are two flutes provided but occasionally a drill may be equipped with three and perhaps more flutes or cutting lips. Since drills become dull through use and are economically sharpened, it is desirable to provide apparatus that is operable to facilitate the sharpening of the drills. In sharpening, each cutting lip or flute should be sharpened and to substantially the same extent. Further, each of the flutes must be undercut at the heel so that only the leading edge thereof engages the metal or material being drilled and provides the actual bite or cutting contact with the material. Heretofore no good and inexpensive drill holder has been available that enables a drill to be sharpened so that each flute thereof is sharpened to the same extent and is provided with the same amount of undercut.

It is accordingly an object of this invention to provide a drill holder that will accommodate drills of all sizes and that provides both rotary movement of the drill relative to an abrasive wheel and, at the same time, axial movement thereof for providing the desired undercut at the heel. Another object of the invention is to provide a drill holder that automatically centers drills irrespective of the diameters thereof and provides axial adjustment of the drill so that drills of various lengths may be accommodated. Still another object is in the provision of a drill holder equipped with adjustable stop means so that when adjustment is made to accommodate the axial length of a particular drill, the drill can be returned to the precise axial position after being released from the automatic centering jaws, as when it is necessary to rotate the drill to bring a different cutting flute thereof into engagement with an abrasive wheel. A further object of the invention is in providing a drill holder having a pair of jaws for automatically centering drills of any diameter and incorporating therein handle means that enable the jaws and drill carried thereby to be rotated and simultaneously advanced during the drill sharpening operation. Yet a further object is in providing a drill holder that is simple in construction and inexpensive to fabricate. Additional objects and advantages of the invention will appear as the specification proceeds.

An embodiment of the invention is illustrated in the accompanying drawings, in which—

Fig. 1 is a top plan view of a drill holder embodying my invention; Fig. 2 is a side view in elevation of the drill holder; Fig. 3 is a front view in elevation of the drill holder; Fig. 4 is a transverse sectional view taken on the line 4—4 of Fig. 1; Fig. 5 is a transverse sectional view taken on the line 5—5 of Fig. 1; Fig. 6 is a longitudinal sectional view taken on the line 6—6 of Fig. 2; and Fig. 7 is a perspective view of the jaw holder.

Referring first to Fig. 2, it is seen that the drill holder includes a base that is designated generally with the numeral 10 and which comprises an L-shaped angle member 11 equipped centrally with an elongated slot 12 therethrough that enables the member 11 to be adjustably clamped upon a bench or other supporting surface. Secured to the vertical portion 13 of the member 11 is a backing plate 14 equipped with spaced-apart threaded apertures therein that are aligned with apertures through the vertical portion 13 of the member 11, and cap screws 15 secure the vertical flange 13 and backing plate 14 together.

The members 13 and 14 have a vertically-extending passage therethrough that receives therein a shaft 16 equipped at its upper end with a scale plate 17. Preferably, the shaft 16 is mounted within the bore or passage through the members 13 and 14 for pivotal movement therein, and the cap screws 15 may be tightened to secure the member 16 in any position relative to the members 13 and 14. The scale plate 17 has a central aperture therethrough that receives a threaded stud 18 threadedly receiving at its outer end a wing nut 19. The stud 18 is rigidly secured to an elongated mounting or support plate 20, and it will be appreciated that the plate 20 is adjustable relative to the scale plate 17 and that the threaded stud and wing nut are operable to secure the member 20 in any angular position relative to the plate 17 and shaft 16. To facilitate angular positioning of these members, the scale plate 17 is equipped with scale indicia 21, while the member 20 may be equipped with a witness line 22.

Slidably mounted upon the plate 20 is a carriage designated generally with the numeral 23. The carriage 23 at the forward end thereof includes a collar 24 having a bore 25 therethrough and which is equipped with a depending leg 26 having a recess 27 in one side thereof. At the rear end the carriage 23 includes a collar 28 having a bore 29 therethrough and having formed integrally therewith at the lower end a forwardly- and downwardly-turned leg 30. The downwardly-turned portion 31 of the leg is equipped with a recess 32 in one side thereof adapted to align axially with the recess 27 in the leg 26 at the forward end of the carriage.

By referring to Figs. 2 and 6, it will be apparent that the recesses 27 and 32 slidably receive therein the plate member 20, and that the plate 20 is secured within the recesses by a backing plate 33 which may be secured to the legs 31 and 26 by any suitable means, such as by welding or by cap screws 34, as is indicated in Fig. 3.

Since the carriage 23 is axially movable relative to the plate member 20, it is desirable to provide a means for securing the carriage and plate in selected relative positions and, at the same time, to provide for ready and accurate adjustment of the position of the carriage relative to the plate. This is accomplished preferably by turning the rear end portion of the plate 20 laterally to provide an ear 35 having an aperture 36 therethrough. The aperture 36 rotatably receives a threaded bolt 37 equipped at one end with an enlarged nut portion 38 that may, if desired, be knurled to facilitate the gripping thereof. On the forward side of the ear 35 a nut 39 is threaded onto the bolt and is brought into engagement with the ear 35. The nut 39 and the enlarged nut portion 38 prevent axial movement of the bolt 37 within the aperture 36. The backing plate 33 is provided with a laterally-extending ear 40 having a threaded aperture therein that threadedly receives the bolt 37. Thus the bolt, when rotated, is operative to advance or retract the ear 40 and plate 33 rigidly secured thereto and, therefore, the carriage 23. At the same time, the nuts 39 and 38 prevent axial movement of the bolt 37 relative to the ear 35 and plate 20 and, therefore, the plate 20 and carriage 23 are locked by the bolt in any position of adjustment thereof.

It is clear that the collars 24 and 28 are spaced apart and the bores therethrough are in substantial axial alignment. Rotatably mounted within the bores is an elongated jaw holder or barrel member 41. The jaw holder 41 has a forward cylindrical or tubular portion 42 rotatably received within the forward collar 24, while at the rear end of the jaw holder a substantially closed cylindrical portion 43 is rotatably received within the rear collar 28. Intermediate the ends 42 and 43 the member 41 is substantially semi-tubular and is equipped on one side with a laterally-extending fork member 44 and on the opposite side thereof a laterally-extending hinge plate 45 having spaced-apart hinge barrels 46 and 47 equipped with aligned passages 48 and 49 respectively therethrough.

Referring now to Figs. 3, 4, and 5, in particular, it is seen that a lower jaw 50 and an upper jaw 51 each equipped with hinge barrels are hingedly secured to the plate 45 by a hinge pin 52a that extends through all of the hinge barrels provided by the jaws 50 and 51 and by the hinge plate 45. The lower jaw 50 is equipped with an arcuate jaw portion 52 that is substantially coaxial with the barrel member 41. The upper hinge or jaw 51 is equipped with a depending web 53 having an arcuate jaw portion 54 at the lower end thereof that is complementary to the jaw portion 52 and is also substantially coaxial with the barrel or jaw holder 41.

Adjacent the jaw portion 52 the lower jaw 50 is equipped with a bifurcated end 55 receiving between the spaced fingers thereof a threaded nut 56. The end portion of the upper jaw 51 is also bifurcated at 57 and a threaded nut 58 is received between the fingers thereof and is secured in this position by a bifurcated plate 59 secured to the jaw 51 by cap screws 60. If reference is made to Figs. 3 and 4, it will be seen that the nuts 56 and 58 are secured in position upon the jaws 50 and 51 by pins 61 and 62, respectively.

A bolt 63 having an upper end portion equipped with left-hand threads, designated generally with the numeral 64, and a lower end portion equipped with righthand threads, designated generally with the numeral 65, is threadedly received in the nuts 56 and 58. The nuts 56 and 58 have threaded bores therethrough wherein the threads are complementary to the left- and right-hand threaded portions provided by the bolt 63 so that the bolt is threadedly received in each of the nuts. At its upper end, the bolt 63 has rigidly secured thereto a wing nut 66, and at its lower end the bolt is equipped with a pair of spaced-apart washers 67 that receive therebetween the fork portion 44 of the jaw holder 41 and secure the bolt against movement relative thereto. Since the nuts 56 and 58 have right- and left-hand threads and the bolt 63 has complementary thread portions, it will be apparent that upon rotation of the bolt 63 in one direction the upper and lower jaws and jaw portions 52 and 54 carried thereby will be moved together about the central axis, while upon rotation of the bolt in the opposite direction the jaws will be spread apart. Because the jaws converge and diverge from a single axis, the jaws are effective to center a member therebetween irrespective of the diameter of the member.

By referring to Fig. 1, it will be seen that the lower jaw portion 52 is elongated and extends rearwardly through the collar 28 and portion 43 therein of the jaw holder 41, and at its rear end is equipped with an elongated slot 68. A stop member 69 equipped with a threaded shaft portion 70 and a forward head 71 is threadedly received within a slidable plug 72 equipped with a threaded bore therethrough that threadedly receives the shaft portion 70 of the stop. A bore provided by the plug 72 extends centrally therethrough at substantially right angles to the threaded bore and is threaded at each end thereof. At the upper end a set screw 73 is received within the bore and may be brought to bear against the threaded shaft 70 so as to lock it in any selected position relative to the plug 72. Similarly, a set screw 74 is received in the lower portion of the bore and it extends through the slot 68 provided by the lower jaw member. Thus, upon tightening and loosening of the set screw 74, the stop member and plug 72 may be moved axially relative to the jaws and may be rigidly secured at any selected position when the set screw is tightened.

Referring now to Figs. 1 and 4, in particular, it is seen that the forward collar 24 provided by the carriage 23 is equipped along the upper surface thereof with an angularly-extending slot 75. The slot 75 is generally circumferential but angles rearwardly and forwardly relative to the collar. The hinge holder 41 is mounted within the collars 24 and 28 for pivotal movement relative therethrough and the forward tubular portion 42 of the member 41 is provided with an outwardly-extending pin 76 which may be a cap screw as illustrated, and the pin 76 is slidably received within the slot 75. The pin 76 is effective to limit pivotal movement in each direction of the jaw holder 41 and jaws carried thereby relative to the collar 24 and carriage 23. At the same time, since the slot 75 is angularly oriented and since the pin 76 substantially fills the slot from side to side thereof, pivotal movement of the jaw holder 41 causes it to move axially relative to the collar 24 and carriage 23. Thus, when the member 41 is pivoted in one direction, it and the jaws carried thereby are advanced relative to the carriage and collar 24, while when pivoted in the opposite direction, the members slide rearwardly relative to the collar.

It will be noted in Figs. 3 and 4 that a drill 77 is illustrated in position between the upper and lower jaws and that the drill is equipped with cutting flutes 78 and 79.

*Operation*

In operation of the structure, the base 10 is secured to a bench adjacent an abrasive wheel and because of the elongated slot 12, relatively accurate positioning of the base relative to the abrasive wheel is provided. A drill of any diameter is placed between the upper and lower jaws and the bolt 63 rotated in a direction that draws the jaw portions 52 and 54 tightly about the drill. The stop member 69, which has been loosened by appropriate rotation of the set screw 74, is brought into abutting engagement with the rear end of the drill supported between the jaws and the set screw 74 then tightened. The angular position of the drill in a horizontal plane relative to the abrasive wheel may be adjusted by rotating the shaft 16 as necessary within the bore through the base members 13 and 14. Similarly, the angular position of the drill relative to the abrasive wheel in the vertical plane may be adjusted by loosening the wing nut 19 and pivoting the carriage 23 and plate 20 relative thereto. The precise position may be selected by aligning the witness line 22 with the selected point on the scale indicia 21. The wing nut 19 is then tightened to secure the members in this position. The drill may then be brought against the abrasive wheel by turning the knurled nut 38 in the proper direction which will advance the carriage 23 relative to the plate 20, base 10, and abrasive wheel. The drill is then ready to be sharpened.

It should be noted that when the drill is positioned within the jaws, that the leading edge of one of the flutes should be arranged so as to initially engage the abrasive wheel. In this position the hinge plate 44 and barrel member 41 will be in the position illustrated in Fig. 3 or, in other words, the hinge plate 45 will be substantially horizontal. The hinge plate 45 and jaws 50 and 51 may then be gripped and swung upwardly and into the position illustrated in Fig. 4. This motion is effective to rotate the drill 77 so that the entire circumferential surface of one flute thereof will be moved through engagement with the abrasive wheel and, at the same time, the hinge plate 45, barrel member 41, and jaw members will be advanced through an axial distance dependent upon the angular orientation of the slot 75, and as the drill advances it will, of course, be brought into tighter engagement with the abrasive wheel and more material will be removed therefrom so that the heel of the flute will be undercut or relieved.

The hinge plate 45 may then be returned to the initial horizontal position and the bolt 63 then rotated to loosen the jaw portions 52 and 54 to release the drill therebetween. The drill will then be rotated through approximately 180° to bring the cutting lip or leading edge of the next flute into alignment with the abrasive wheel. The bolt 63 is then rotated to tighten the jaws and the procedure set out above is repeated, the drill being rotated and advanced to sharpen the flute and undercut the same. There is no danger of getting the drill out of axial position when the jaws are released, because the stop member 69 provides a guide for reestablishing the axial position of the drill within the jaws. Thus, after each release of the drill it is simply moved into abutting engagement with the stop member before the jaws are again tightened.

A drill of any diameter will be accurately centered because of the cooperative movement of the upper and lower jaws. They move simultaneously and converge and diverge about a single axis, and the drill holder then readily accommodates drills of any size. The jaws are hingedly secured to the hinge plate 41 and extend outwardly from the member 41 and carriage collars 24 and 28, and provide a handle that may be readily gripped by the operator of the drill holder. Thus the jaws provide not only apparatus that automatically centers a drill of any diameter within the drill holder, but also provides a handle which enables the operator to rotate and advance the drill during the sharpening thereof.

While in the foregoing specification an embodiment of the invention has been set out in considerable detail for purposes of illustration, it will be apparent to those skilled in the art that considerable change in these details may be made without departing from the spirit and principles of the invention.

I claim:

1. In a drill holder adapted for use with drills during the sharpening thereof, a base, a carriage mounted upon said base and equipped with a forward collar and spaced therefrom a rearward collar, a jaw holder pivotally mounted within said collars, said forward collar being provided with a circumferential slot therethrough oriented in angular relation with a diametric circumferential line, said jaw holder being equipped with a pin extending into said slot and being slidable therein, said jaw holder being equipped with a laterally-extending hinge connection, a pair of jaws hingedly connected to said hinge connection and adapted for opening and closing movement within said jaw holder, and a bolt pivotally mounted upon said jaw holder and threadedly engaging each of said jaws, the end portions of said bolt having threads oriented in opposite directions whereby rotation of said bolt results in said jaws opening or selectively closing about a predetermined axis therebetween, pivotal movement of said jaw holder being operative to rotate said jaws and advance the same both relative to a longitudinal axis through said forward and rear collars.

2. The structure of claim 1 in which said carriage is mounted upon said base for axial movement relative thereto.

3. The structure of claim 1 in which said carriage is pivotally mounted upon said base for movement in a vertical plane relative thereto.

4. The structure of claim 1 in which said carriage is pivotally carried upon said base for swinging movement in a horizontal plane.

5. The structure of claim 1 in which one of said jaws has a stop member adjustably mounted thereon for axial movement relative thereto.

6. A drill holder, comprising a base, a standard pivotally mounted in said base, a carriage pivotally mounted upon said standard for movement in a vertical plane, said carriage also being adjustably carried by said standard for axial movement, a pair of spaced, axially aligned collars provided by said carriage, one of said collars being equipped with an elongated slot therethrough oriented angularly along the longitudinal axis thereof, a jaw holder pivotally mounted within said collars and equipped with a pin extending through said slot and being slidable therein, said jaw holder being equipped with a hinge connection extending outwardly therefrom between said collars, a pair of jaws hingedly connected to said hinge connection and being movable to open and closed positions for the gripping and release of a drill, a stop carried by one of said jaws and adjustable axially relative thereto for determining the axial position of a drill carried by said jaws, and a bolt threadedly engaging said jaws and having half portions equipped with oppositely oriented threads whereby rotation of said bolt is operative to selectively converge and diverge said jaws simultaneously about a predetermined axis therebetween, said hinge connection being adapted to be gripped for pivoting said jaw holder within said collars, pivotal movement thereof being operative to move said jaw holder and jaws along the longitudinal axis of said collars.

7. In a drill holder adapted for use with drills during the sharpening thereof, a base, a carriage mounted upon said base and equipped with a pair of spaced apart collars, a jaw holder pivotally mounted within said collars, one of said collars being provided with a circumferential slot therethrough oriented in angular relation with a diametric circumferential line, said jaw holder being equipped with a pin extending into said slot and being slidable therein, said jaw holder being equipped with a laterally-extending hinge connection, a pair of jaws hingedly connected to said hinge connection and adapted for opening and closing movement within said jaw holder, and a bolt pivotally mounted upon said jaw holder and threadedly engaging each of said jaws, the end portions of said bolt having threads oriented in opposite directions whereby rotation of said bolt results in said jaws opening or selectively closing about a predetermined axis therebetween, pivotal movement of said jaw holder being operative to rotate said jaws and advance the same relative to a longitudinal axis through said collars.

8. A drill holder comprising a base, a carriage mounted upon said base, a jaw holder movably mounted upon said carriage for pivotal and longitudinal movement with respect thereto, said jaw holder being equipped with a laterally extending hinge connection, a pair of jaws hingedly connected to said hinge connection and adapted for opening and closing movement within said jaw holder, a bolt pivotally mounted upon said jaw holder and threadedly engaging each of said jaws, the end portions of said bolt having threads oriented in opposite directions whereby rotation of said bolt results in said jaws opening or selectively closing about a predetermined axis therebetween, and means for advancing said jaws and holder longitudinally with respect to said carriage as said holder is pivoted.

9. The structure of claim 8 in which said carriage is mounted upon said base for axial movement relative thereto.

10. The structure of claim 8 in which said carriage is pivotally mounted upon said base for movement along vertical and horizontal planes.

11. In a drill holder adapted for use with drills during the sharpening thereof, a base, a carriage mounted upon said base and equipped with a pair of spaced apart and axially aligned collars, a jaw holder pivotally mounted within said collars, said jaw holder being equipped with a laterally extending hinge connection, a pair of jaws hingedly connected to said hinge connection and adapted for opening and closing movement within said jaw holder, a bolt pivotally mounted upon said jaw holder and threadedly engaging each of said jaws, the end portions of said bolt having threads oriented in opposite directions for pivoting said jaws in opposite directions upon rotation of said bolt, and means for moving said jaw holder and jaws along the longitudinal axis of said collars upon pivotal movement of said jaw holder.

References Cited in the file of this patent

UNITED STATES PATENTS

| | | |
|---|---|---|
| 141,760 | Card | Aug. 12, 1873 |
| 237,922 | Stetson | Feb. 15, 1881 |
| 292,599 | Tasker | Jan. 29, 1884 |
| 520,749 | Bancroft | May 29, 1894 |
| 1,322,370 | Strathern | Nov. 18, 1919 |
| 1,981,174 | Hille | Nov. 20, 1934 |
| 2,207,804 | Hoagland | July 16, 1940 |
| 2,429,057 | Hanford | Oct. 14, 1947 |
| 2,583,159 | Swanson | Jan. 22, 1952 |

FOREIGN PATENTS

| | | |
|---|---|---|
| 39,275 | Germany | June 2, 1886 |